US011382060B2

(12) United States Patent
Vos et al.

(10) Patent No.: US 11,382,060 B2
(45) Date of Patent: Jul. 5, 2022

(54) METHOD AND SYSTEM FOR PAGING USER EQUIPMENT

(71) Applicant: SIERRA WIRELESS, INC., Richmond (CA)

(72) Inventors: Gustav Gerald Vos, Surrey (CA); Steven John Bennett, Coquitlam (CA)

(73) Assignee: SIERRA WIRELESS, INC., Richmond (CA)

( * ) Notice: Subject to any disclaimer, the term of this patent is extended or adjusted under 35 U.S.C. 154(b) by 338 days.

(21) Appl. No.: 15/283,967

(22) Filed: Oct. 3, 2016

(65) Prior Publication Data

US 2017/0099649 A1    Apr. 6, 2017

Related U.S. Application Data

(60) Provisional application No. 62/236,667, filed on Oct. 2, 2015.

(51) Int. Cl.
*H04W 68/00*   (2009.01)
*H04W 76/28*   (2018.01)
*H04W 72/04*   (2009.01)

(52) U.S. Cl.
CPC ....... *H04W 68/005* (2013.01); *H04W 72/048* (2013.01); *H04W 76/28* (2018.02)

(58) Field of Classification Search
USPC ........................................................ 370/329
See application file for complete search history.

(56) References Cited

U.S. PATENT DOCUMENTS

| 9,788,300 | B2 * | 10/2017 | Zhang | H04W 68/02 |
| 9,860,870 | B2 * | 1/2018 | Sundberg | H04L 1/0013 |
| 10,028,329 | B2 * | 7/2018 | Vajapeyam | H04W 76/28 |
| 10,455,505 | B2 * | 10/2019 | Bangolae | H04W 52/0216 |

(Continued)

FOREIGN PATENT DOCUMENTS

| CA | 2675250 A1 | 7/2008 |
| WO | 2013170448 A1 | 11/2013 |

(Continued)

OTHER PUBLICATIONS

R2-153060, Report of 3GPP TSG RAN WG2 meeting #90, May 25-29, 2015, pp. 1-147, Fukouoka, Japan.

(Continued)

*Primary Examiner* — Gregory B Sefcheck
*Assistant Examiner* — Majid Esmaeilian
(74) *Attorney, Agent, or Firm* — Pillsbury Winthrop Shaw Pittman LLP

(57) ABSTRACT

The present invention provides a method and system for paging User Equipment (UE). According to embodiments, repetition of paging can help UEs to more reliably receive pages when they are operating in idle mode DRX, and in particular enhanced idle mode DRX (eDRX). The UE and the eNB are cooperatively configured to determine an eDRX time interval and a value for paging occasion (PO) repetition based on one or more parameters, such as UE mobility requirements; UE power requirements; latency requirements, and timing discrepancies between base stations. The base station transmits pages, and the UE monitors for said pages, with timing that is based on the eDRX time interval and the PO repetition values.

15 Claims, 3 Drawing Sheets

(56) References Cited

U.S. PATENT DOCUMENTS

| | | | |
|---|---|---|---|
| 10,841,876 B2* | 11/2020 | Bhattad | H04W 52/0235 |
| 2007/0291673 A1 | 12/2007 | Demirhan et al. | |
| 2013/0301501 A1* | 11/2013 | Olvera-Hernandez | H04W 76/28 370/311 |
| 2014/0112221 A1 | 4/2014 | Verger et al. | |
| 2015/0023238 A1 | 1/2015 | Fukuta et al. | |
| 2015/0208327 A1* | 7/2015 | Baratam | H04W 48/16 455/432.1 |
| 2016/0044578 A1* | 2/2016 | Vajapeyam | H04W 52/0216 370/252 |
| 2016/0044605 A1* | 2/2016 | Vajapeyam | H04W 52/322 370/311 |
| 2016/0066296 A1* | 3/2016 | Su | H04W 76/28 455/458 |
| 2016/0212681 A1* | 7/2016 | Linden | H04L 41/0853 |
| 2016/0295504 A1* | 10/2016 | Wang | H04W 52/02 |

FOREIGN PATENT DOCUMENTS

| | | |
|---|---|---|
| WO | 2015/002578 A1 | 1/2015 |
| WO | 2015002578 A1 | 1/2015 |
| WO | 2016/022748 A1 | 2/2016 |
| WO | 2017054092 A1 | 4/2017 |

OTHER PUBLICATIONS

Patent Cooperation Treaty, International Search Report for PCT/CA2016/051148, dated Jan. 11, 2017, pp. 1-3.

Patent Cooperation Treaty, Written Opinion for PCT/CA2016/051148, dated Jan. 11, 2017, pp. 1-3.

European Patent Office, Extended European Search Report for corresponding EP Patent Application No. 16849994.5, dated Feb. 19, 2019, pp. 1-12.

3GPP Standard: 3GPP TS 24.008, 3rd Generation Partnership Project;Technical Specification Group Core Network and Terminals; Mobile radio interface Layer 3 specification; Core network protocols; Stage 3 (Release 13), Sep. 2015, XP050996317, pp. 1-202, Part 1.

3GPP Standard: 3GPP TS 24.008, 3rd Generation Partnership Project;Technical Specification Group Core Network and Terminals; Mobile radio interface Layer 3 specification; Core network protocols; Stage 3 (Release 13), Sep. 2015, XP050996317, pp. 203-400, Part 2.

3GPP Standard: 3GPP TS 24.008, 3rd Generation Partnership Project;Technical Specification Group Core Network and Terminals; Mobile radio interface Layer 3 specification; Core network protocols; Stage 3 (Release 13), Sep. 2015, XP050996317, pp. 401-556, Part 3.

3GPP Standard: 3GPP TS 24.008, 3rd Generation Partnership Project;Technical Specification Group Core Network and Terminals; Mobile radio interface Layer 3 specification; Core network protocols; Stage 3 (Release 13), Sep. 2015, XP050996317, pp. 557-727, Part 4.

Fujitsu Limited, "Remaining issues on the I-eDRX", 3GPP TSG-RAN WG2 Meeting #91bis, R2-154310, Oct. 2015, pp. 1-6, Malmo, Sweden.

Intel, "Solution for paging coordination between CN and UE", SA WG2 Meeting #109 S2-151762, May 2015, pp. 1-3, Fukuoka, Japan.

European Patent Office, Office Action issued in EP Application No. 16849994.5, dated Feb. 6, 2020, pp. 1-7.

Ericsson, "On paging coordination in extended idle mode DRX", 3GPP Draft, R3-152136, Sep. 26, 2015, pp. 1-4, XP051026045.

European Patent Office, Office Action in EP Patent Application No. 16849994.5, dated Feb. 15, 2021, pp. 1-10.

\* cited by examiner

METHOD AND SYSTEM FOR PAGING USER EQUIPMENT

CROSS-REFERENCE TO RELATED APPLICATIONS

This application claims the benefit and priority of U.S. Provisional Application 62/236,667, filed Oct. 2, 2015. The foregoing application is incorporated by reference herein in its entirety.

FIELD OF THE INVENTION

The present invention pertains in general to wireless communications and in particular to methods and systems for paging user equipment in Long Term Evolution (LTE) communication systems.

BACKGROUND

Mobile wireless devices typically have limited battery life and reducing power consumption is an ongoing concern. As radio receivers typically consume significant power, one common approach is to turn off the radio when not in use. However in cellular systems such as LTE, mobile devices are also required to be sufficiently responsive to paging messages, for example such that mobile devices can be contacted without significant delay.

Discontinuous Reception (DRX) is a feature whereby a User Equipment (UE) can enter a low power state and wake at predetermined time intervals to determine if the network has a message pending for the UE to receive. A common formula is used by both the UE and the network to define the expected time for a paging transmission for each UE that uses the DRX feature. The time of a paging transmission is designated by a paging occasion (PO) within a paging frame (PF) within the LTE timing structure. For DRX, the current standard maximum amount of time that a UE may sleep between paging messages is 2.56 seconds. One purpose of the DRX feature is to enable longer UE battery life. A disadvantage of DRX is that there is a potential delay in contacting a UE, due to the sleep time.

Therefore there is a need for methods and apparatus for paging user equipment that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for paging user equipment (UE). In accordance with an aspect of the present invention, there is provided a method for paging a User Equipment (UE), the method comprising determining, by a base station, an enhanced discontinuous reception (eDRX) time interval and a value for paging occasion (PO) repetition based on one or more parameters; and transmitting, by the base station, a page transmission and a page transmission repetition based on the eDRX time interval and the value for PO repetition.

In accordance with another aspect of the present invention, there is provided a method for receiving pages by a User Equipment (UE), the method comprising, by the UE, determining an enhanced discontinuous reception (eDRX) time interval and a value for paging occasion (PO) repetition based on one or more parameters; transmitting the eDRX time interval and the value for PO repetition to a base station; and monitoring for a page transmission.

In accordance with another aspect of the present invention, there is provided a system for paging a User Equipment (UE), the system comprising: a UE having a first (UE) enhanced discontinuous reception (eDRX) controller configured to manage eDRX operation of the UE; and a base station having a second (eNB) eDRX controller configured to manage a paging operation of the base station, wherein the first and second eDRX controller are cooperatively configured to determine an enhanced discontinuous reception (eDRX) time interval and a value for paging occasion (PO) repetition based on one or more parameters, wherein the second eDRX controller is further configured to direct the base station to transmit a page transmission and a page transmission repetition based on the eDRX time interval and the value for PO repetition, and wherein the first eDRX controller is further configured to direct the UE to monitor for the page transmission and the page transmission repetition based on the eDRX time interval and the value for PO repetition.

In accordance with another aspect of the present invention, there is provided a user equipment (UE) comprising an enhanced discontinuous reception (eDRX) controller configured to: determine an enhanced discontinuous reception (eDRX) time interval and a value for paging occasion (PO) repetition based on one or more parameters; direct the UE to communicate either the enhanced discontinuous reception (eDRX) time interval and the value for paging occasion (PO) repetition or the one or more parameters to the base station; and direct the UE to monitor for the page transmission and the page transmission repetition based on the eDRX time interval and the value for PO repetition.

In accordance with another aspect of the present invention, there is provided a base station comprising an enhanced discontinuous reception (eDRX) controller configured to: determine an enhanced discontinuous reception (eDRX) time interval and a value for paging occasion (PO) repetition based on information received from a user equipment (UE), the eDRX time interval and the value for PO repetition based on one or more parameters; and direct the base station to transmit a page transmission and a page transmission repetition based on the eDRX time interval and the value for PO repetition.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
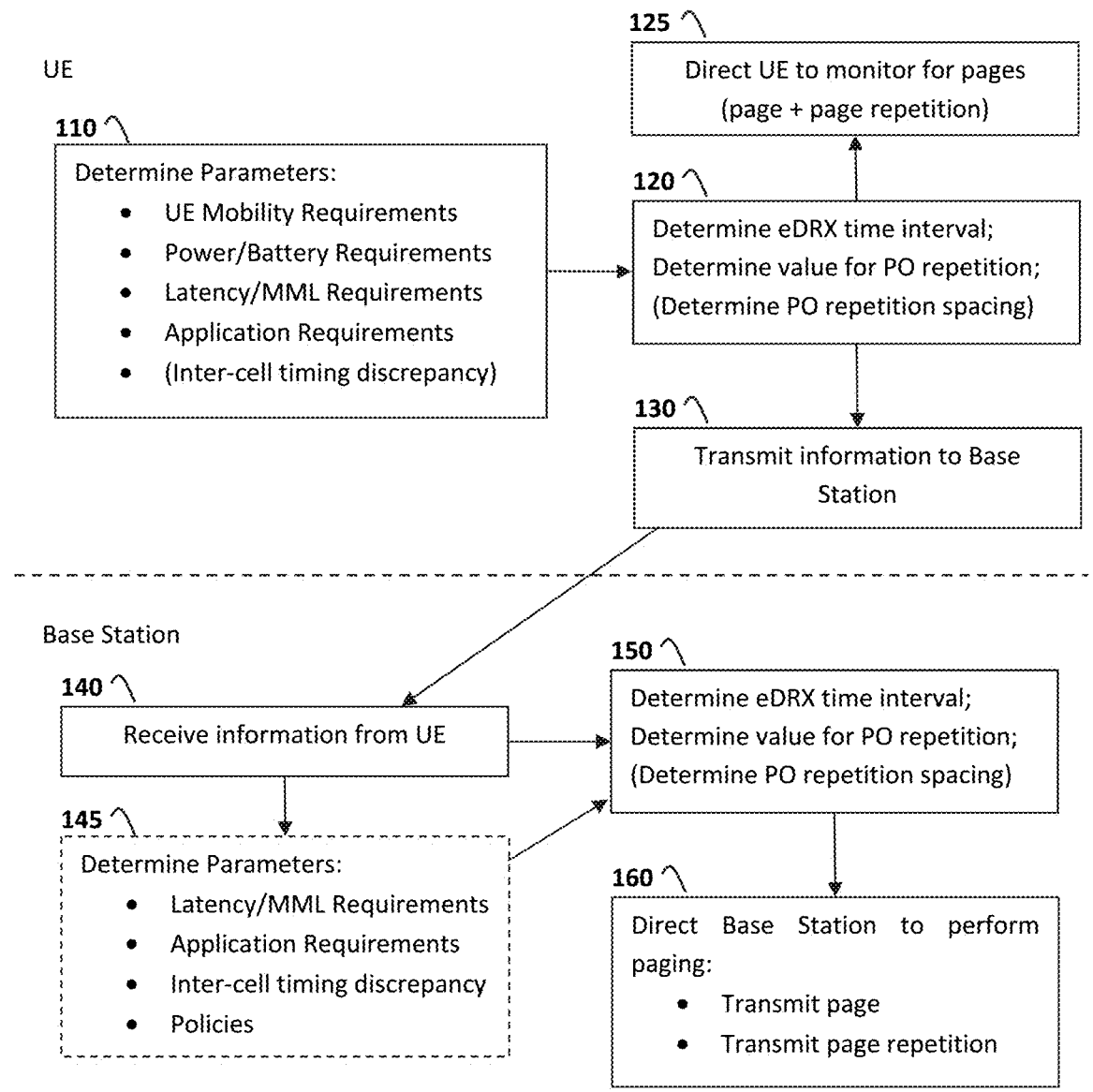
FIG. 1 illustrates a method for supporting and configuring paging and eDRX operations in accordance with embodiments of the present invention.

As used herein, the term "about" refers to a +/−10% variation from the nominal value. It is to be understood that such a variation is always included in a given value provided herein, whether or not it is specifically referred to.

The term "base station" refers to an evolved NodeB (eNB), a radio access node, or another device in a wireless communication network infrastructure, such as an LTE infrastructure, which performs or directs at least some aspects of wireless communication with wireless communication devices, including but not necessarily limited to paging.

Unless defined otherwise, all technical and scientific terms used herein have the same meaning as commonly understood by one of ordinary skill in the art to which this invention belongs.

The present invention provides a method and system for paging mobile (or stationary) wireless communication devices, commonly referred to as User Equipment (UE). The UEs may be operative for wireless communication with a communication network configured according to the Long Term Evolution (LTE) standard or a similar standard, for example. According to embodiments, repetition of paging transmissions can result in more reliable receipt of pages by UEs when they are operating in idle mode DRX, and in particular enhanced idle mode DRX (eDRX). Enhanced DRX is a technology described in association for example with the LTE standard. However, as used herein, eDRX can refer to the standardized technology or a comparable mode of operation, such as a variant of standard DRX or eDRX. Typically, the idle mode is the state in which the UE operates when it is not actively in communication, but rather is waiting for an incoming call or for an application to originate an outgoing call.

According to some embodiments of the present invention, repeat paging transmissions occur at successive Paging Occasions (POs). In some embodiments, in order to improve paging reliability, the paging transmission can be repeated on different Paging Occasions, which may be determined using a known DRX formula for a certain time window.

According to embodiments, eDRX can be applied to a variety of categories of UEs. However, eDRX can be particularly useful in low cost, Internet of Things (IoT) UEs that can tolerate communication delay in order to achieve longer battery life. In some embodiments, for IoT UEs the length of the eDRX may be up to about 1 hour or more.

According to embodiments of the present invention, repetition of paging transmissions can help UEs to more reliably receive paging transmissions when they are operating in idle mode eDRX. For example, if the probability of successfully receiving a paging transmission due to signal conditions on a single attempt or Paging Occasion (PO) is approximately 90% then a second PO can raise the probability of successfully receiving the page transmission to approximately 99%. The inclusion of a third PO can raise the probability of successfully receiving the page transmission to approximately 99.9%. Given this example, if there is only one PO per eDRX cycle then approximately 10% of page transmissions are expected fail on that cycle. According to embodiments, if the time until the next PO is a few seconds (as in the legacy standard regarding DRX), then the delay for the receipt of the page transmissions on the second or third POs, may not cause a problem for the UE. However for the instance of a long eDRX time, for example 30 minutes or more, the reception of page transmissions by many UEs can be significantly delayed. According to embodiments, there is an advantage for having paging transmission being successfully received when compared to repeating the paging occasions on each eDRX cycle. When the number of paging retries is reduced, paging delay and system resources are also reduced.

According to embodiments of the present invention, the UE may request a number of page transmission repetitions. For example, the UE may communicate to the base station a paging occasion (PO) repetition value equal to a number of page transmission repetitions being requested. According to some embodiments of the present invention, the communication system is configured to use plural page transmission repetitions for UEs that are operating using longer eDRX intervals.

According to embodiments, the spacing between the page transmission repetitions is configurable. In some embodiments, the spacing between the page transmission repetitions can be determined based on other objectives, or constraints, or both, such objectives and constraints relating to the communication with the UE. In some embodiments, the spacing between pages may be based on an inter-cell timing discrepancy indicative of expected variations in paging timings between base stations.

According to some embodiments, the UE can determine one or more of the parameters relating to eDRX and PO based on UE parameters directly connected with the specific UE. For example the UE parameters can be based on UE application information, including UE network subscription details or other UE specific information that may be centrally located and stored on the communication network. Other UE specific parameters that may be used for the determination of eDRX and PO details would be readily understood by a worker skilled in the art.

FIG. 1 illustrates operations performed by a UE and by a base station, in accordance with an embodiment of the present invention. The UE determines 110 one or more parameters that will be used to configure eDRX timing and PO repetition and optionally PO timing. Some or all of the parameters are associated with operation of the UE. Some or all of the following parameters may be determined, for example by reading memory of the UE in which the parameter values are stored. At least some parameters may be dictated by operation of an application, as explained below. A first parameter may be a UE mobility requirement parameter, which indicates the amount of expected mobility of the UE, for example frequency of movement, range of movement, speed, and the like. A second parameter may be a UE power or battery requirement, which indicates the amount of power resources available or desired for use in monitoring for pages by the UE. A third parameter is a latency or Mobile terminated Message Latency (MML) requirement, indicative of the amount of delay in receiving pages which is tolerable by the UE. A fourth parameter is a set of one or more particular requirements of applications operating on or in association with the UE. In some embodiments, other requirements, such as the latency or MML requirements, may be configured based on the application requirements. A fifth parameter is an inter-cell timing discrepancy, indicative of expected variations in paging clocks/timings between base stations. Alternatively, the fifth parameter can be determined at the base station rather than at the UE.

The parameters 110 are used as a basis for determining 120 an enhanced discontinuous reception (eDRX) time interval and a value for paging occasion (PO) repetition. In some embodiments, the parameters are also used as a basis for determining a PO repetition spacing, i.e. a time interval or minimum time interval between repeated POs. The eDRX time interval may be an eDRX cycle time, which is the period of time in which the UE completes one on/off cycle. The value for PO repetition may indicate the number of POs to be performed during each eDRX time interval. The determination of these values may be performed for example in order to satisfy one or more UE requirements as indicated in the received parameters 110. For example, the values may be determined so as to optimize a trade-off between power consumption and latency (and/or reliability), to provide a certain level of paging reliability, or the like.

The UE is then directed 125 to monitor for pages from the base station on the basis of a monitoring schedule which accounts for the eDRX time interval, the PO repetition value, and optionally the PO repetition spacing. The monitoring schedule indicates times at which the UE is to power up its receiver and monitor for possible pages. The UE monitors for at least a page transmission and a page repetition transmitted by the base station in accordance with a paging schedule which is synchronized with the monitoring schedule.

The UE also transmits 130 information to the base station for use in configuring the paging schedule at the base station. In some embodiments, the transmitted information includes the determined eDRX time interval, the PO repetition value, and the PO repetition spacing (if used). In this case, the base station can configure the paging schedule based on the provided parameters. In other embodiments, the transmitted information may include the parameters 110 determined by the UE, which can be used to re-determine, at the base station, the eDRX time interval, the PO repetition value, and the PO repetition spacing (if required). The transmission may be performed via a wireless control channel, for example.

The base station receives 140 the information from the UE and determines 150 the eDRX time interval, the PO repetition value, and the PO repetition spacing (if required). The determination is performed in such a manner that the base station and the UE determine substantially the same values. For example, the determination 150 by the base station may comprise reading the values as explicitly provided by the UE. As another example, the UE and the eNB may use the same logic or rule set for determining the values, and the parameters used by the UE for the determination may be provided to the base station via the transmitted information and then used by the base station in the determination 150. Because the UE and the eNB derive the same values from the same data using the same logic rules, the results of both derivations are expected to be identical.

According to embodiments, while the UE can request a particular set of parameters to be enabled by the base station, in some instances the base station is unable to provide the requested parameters, for example due to sharing resources, for example base station resources, between plural UEs or other parameters as would be readily understood by a worker skilled in the art. As such, it is the base station or depending on the configuration, the network controlling paging in multiple base stations, that defines the parameters relating to eDRX and PO which are to be used. The base station will subsequently provide the particular details relating to the revised eDRX time interval, revised PO repetition value and/or revised PO repetition spacing for use by the UE.

The base station is then directed 160 to perform paging on the basis of a paging schedule which accounts for the eDRX time interval, the PO repetition value, and optionally the PO repetition spacing. The paging schedule indicates times at which pages are to be transmitted by the base station, if such pages are pending. The pages include at least a page transmission and a page repetition transmitted by the base station in accordance with the paging schedule which is synchronized with the UE's monitoring schedule.

In some embodiments, the base station may also determine 145 parameters which are to be used by the eNB in determining the eDRX time interval, PO repetition value and/or PO repetition spacing. Such parameters may include latency/MML requirements, application requirements, inter-cell timing discrepancies, and policies such as operator policies directing limitations to paging configurations. In various embodiments, if the determination 150 is to be made based on one or more parameters not available to the UE, then the UE may be notified of the additional parameters or a change to the values determined based on the parameters, so that the UE can update its monitoring schedule accordingly.

More generally, various parameters, some or all of which may be available to the UE and some or all of which may be available to the base station, are used to determine the eDRX time interval, PO repetition value and optionally the PO repetition spacing. The UE and base station can share the parameters or the values determined based thereon in a configuration phase. Thus, the UE and base station cooperatively determine these values and hence the synchronized paging and monitoring schedules.

Repetition of paging occasions on a DRX cycle increases the probability of a UE successfully receiving the page transmission when the UE wakes. In addition, if during a paging occasion when a page transmission is made, the UE receives this page transmission on the first transmission, then the UE will not need to attempt to monitor and/or receive repeated pages during further POs in that eDRX cycle. However, if a UE expects there to be repeated pages (in the event that the UE is to be paged), the UE will need to wake two times or more during each eDRX cycle. This is because the UE cannot distinguish between a missed page transmission and an eDRX cycle in which no page transmission has been sent. However, it is understood that additional page reception attempts will increase the amount of power used by the UE, and in some cases this increase in the amount of power used can be proportional to the additional number of page reception attempts.

For example; for a first case in which there are two POs spaced 1 second apart in an eDRX cycle of 30 minutes, the UE wakes as often in the long term eDRX cycle and uses about as much power as would occur in a second case in which the UE is trying to receive a single PO once every 15 minutes. Considering these two cases, it can be more effective for the UE to have a shorter eDRX interval (e.g. 15 minutes rather than 30 minutes) and wake once. For this instance, for the same successful page reception probability, the reachability delay for a page originating randomly is shorter in the case of an eDRX of 15 minutes with a single PO when compared with the case of an eDRX of 30 minutes with two closely-spaced POs. For example, the reachability delay can be substantially equivalent to 15-30 minutes for the 15 minute eDRX cycle having one PO as opposed to up to 30 minutes for the 30 minute eDRX cycle having two POs.

It is also understood that there can be a UE based trade-off in power savings against page reception reliability if there is a repeated page transmission available every 15 minutes which a UE does not attempt to receive.

According to embodiments, a parameter of importance is dependent primarily on the needs of the application or applications running on the UE. According to embodiments, Mobile terminated Message Latency (MML) is considered by the application running on the UE as the primary criterion for trading off against power consumption. For example, a longer MML is expected to result in longer battery life for the UE. According to embodiments, the eDRX time is configurable by the application that is operative on the UE. As is known, as each application can have its own MML requirement, by configuring the eDRX time based on the application operating on the UE, tailored operation of the UE can be provided.

Table 1 shows a plurality of different cases for comparison, according to embodiments of the present invention. The different cases relate primarily to eDRX time and MML, also including associated Paging Occasions per eDRX and relative power consumption by the UE. Each case corresponds to a particular eDRX cycle time and a number of paging occasions per eDRX cycle. The power used is specified in multiples of the power used in the base case, i.e. Case #1. The x % MML specifies the expected amount of time elapsed before a page is successfully received with probability x %, given the probability of successful receipt on a single paging attempt is 90%.

TABLE 1

| Case | eDRX | #POs/ eDRX | Power Used | 90% MML | 99% MML | 99.9% MML |
| --- | --- | --- | --- | --- | --- | --- |
| 1 | 30 sec | 1 | 1X | 30 sec | 60 sec | 90 sec |
| 2 | 10 sec | 1 | ~3X | 10 sec | 20 sec | 30 sec |
| 3 | 30 sec | 3 | ~<3X | 30 sec | 30 sec | 30 sec |
| 4 | 30 sec | 1 | 1X | Reception Not Guaranteed | | |
| 5 | 30 sec | 2 | ~<2X | 30 sec | 60 sec | 90 sec |
| 6 | 15 sec | 2 | ~4X | 15 sec | 30 sec | 45 sec |
| 7 | 30 sec | 4 | ~<4X | 30 sec | 30 sec | 30 sec |

Having specific regard to Table 1, Cases 1 to 3, relate to comparisons for a stationary device (UE), namely a UE that remains in the same cell. As can be seen from this table, by using an eDRX cycle of 30 sec, with a single PO as a base case, setting the eDRX to ⅓ of the time (e.g. 10 sec) with a single PO or tripling the POs (e.g. 3 PO per eDRX) with a longer eDRX, both have the same cost in relation to power consumption, when compared to the base Case 1. In both Cases 2 and 3, the time to achieve 99.9% paging success is the same. However, for Case 2, namely the case with the shorter eDRX cycle, 90% and 99% success of page reception for the UEs comes earlier than it can with the repetitions of the page transmission at a longer eDRX cycle.

It is understood that Cases 1, 2 and 3 shown in Table 1 can represent a worst case scenario for power used, as each assumes infrequent paging, requiring reception of every page transmission (and repetition) that is known to be available. In addition, for Case 3, the power used for a 30 second eDRX and three POs, is likely to be less when there are frequent page transmissions to be received, when considering that in most instances the repetitions will not need to be received once a page transmission has been received, for example in 90% and 99% of instances the first PO and second POs respectively are received. It is understood that the worst case scenario can be realistic for the instances that use a long eDRX wherein infrequent pages are sent, while still necessitating a reasonably short MML.

According to embodiments, when considering Case 3, further power saving can be realised for instances where only one receive warm up process is required to receive all three repetitions of the page. It is understood that this scenario can be implementation dependent.

For cases where a UE is mobile, for example a UE that moves from one cell to another while in an eDRX sleep state, there is a significant probability of missing at least one page due a lack of tight timing alignment between adjacent cells. According to embodiments, for cases where the timing in the new cell is slow relative to the previous cell, the UE may re-align and receive a page. For the purpose of evaluation, having regard to a potentially worst case scenario, in Cases 4 to 7 defined in Table 1, it is assumed the first page is always missed because of constant cell changing in every eDRX cycle. It is also assumed that the spacing of the repetitions is wider than the inter-cell timing discrepancy which allows a second or subsequent page to be received with the respective probabilities indicated in Table 1.

Having particular regard to Case 4, it is clear that repetitions of paging are required in order to provide any guarantee of a UE receiving a page.

Having regard to Case 5, paging is sent twice. It can be seen that this repeat page improves the chance of success to the same level as was determined for a static UE (e.g. UE remains in same cell) where one PO is sent (e.g. Case 2). It is noted that the power used by the UE for the detection of the second page is nominally doubled, when compared to a single page being sent. It is also understood, that in order to save power, as for the static Cases 2 and 3, if the initial page is received then the UE can ignore the repetition on that eDRX cycle. It is also understood that since favourable timing or realignment of timing may allow reception of the first page even when mobile, some power may also be saved in POs when a page is sent.

Having regard to Cases 6 and 7, these cases illustrate the effect of doubling the POs for a 15 second eDRX period and the effect of having 4 POs for a 30 second eDRX period. As can be seen from Table 1, the UE nominally has the same power usage but the shorter eDRX period allows for a shorter MML.

According to embodiments of the present invention, the application that is operating on the UE is configured to request a combination of the number of PO repetitions and eDRX interval that satisfies one or more of the MML requirements, battery life requirements and expected mobility requirements for that particular application or UE. In this manner the parameters around the receipt of a page upon a UE waking from eDRX, can be tailored to the UE and application or applications running thereon or otherwise associated therewith.

According to embodiments, for situations where it is not possible for a UE to specify page repetitions, a default value for page repetitions in an eDRX time interval can be assigned. The default value for page repetitions can be determined based on the eDRX time interval. For example, for longer eDRX time intervals, plural repetitions are typically required in order to have a desired probability of receipt of the particular page. As can be seen from Table 1, for longer eDRX intervals, a single PO is typically not ideal. However, for cases where the UE is mobile, for a shorter eDRX cycle, it is unlikely that the UE will actually move from one cell to another on every eDRX cycle, and as such for this case a single PO can be sufficient for a desired reception success rate for many POs.

According to embodiments, examples of default values for repetitions of a PO relative to eDRX interval may be configured as follows: 1) for an eDRX interval up to one minute, one PO is used; 2) for an eDRX interval up to three minutes, 2 POs are used; and 3) for an eDRX interval of over 3 minutes, 3 POs are used. It would be readily understood that alternate default values for relative eDRX intervals to PO used, can be used. Furthermore, it is understood that these default settings can be directed towards the typical use of the UE and the like.

Having regard to existing DRX mechanisms, paging repetition is not considered, as the desired success of page reception is typically achieved due to short DRX intervals in use.

Figure 2:
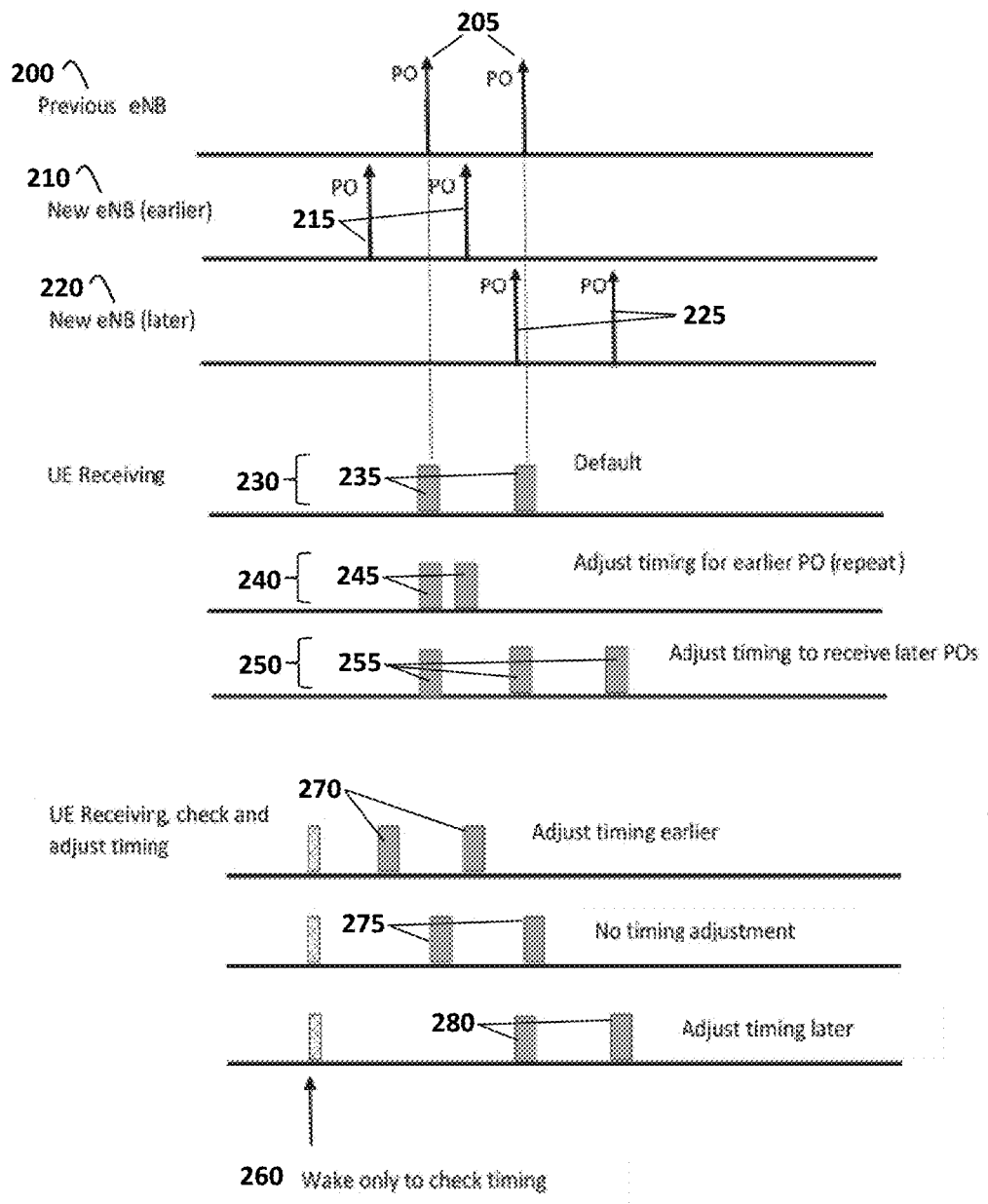
FIG. 2 illustrates an example of paging repetition providing time diversity in accordance with embodiments of the present invention.

According to embodiments of the present invention, page repetitions are spread over time, which can provide improvement in reception due to time diversity. As noted above, cells have loose time synchronisation, which is illustrated in FIG. 2A in relation to POs. FIG. 2A illustrates the timing of two POs 205 associated with a first cell serviced by an eNB 200, for example the eNB that serviced the past location of a UE, as well as the timing of two POs of a second cell serviced by another eNB, for example the new eNB that services the cell into which the UE has just moved. Two scenarios for the second new eNB are illustrated. In the first scenario, corresponding to eNB 210, the timing of the two POs 215 associated with the second cell is earlier than the timing associated with the first cell. In the second scenario, corresponding to eNB 220, the timing of the two POs 225 associated with the second cell is later than the timing associated with the first cell. The maximum time difference between the occurrence of POs in the first cell and the occurrence of POs in the second cell can be estimated based on time synchronization error statistics.

As previously discussed, the repetition of a PO can improve the possibility for a UE to receive a page transmission when mobile. A time difference between PO repetitions which is greater than the inter-cell timing discrepancy can be implemented in order to offer an improved possibility to recover a page transmission in the current eDRX interval. The inter-cell timing refers to the variation in the clocks used for paging in two different cells which the UA may be mobile between. It is known that currently the inter-cell timing discrepancy can be more than the legacy DRX interval (2.56 seconds). For example, if the inter-cell timing discrepancy is 10 seconds then having PO repetitions spaced greater than 10 seconds apart can be an advantage for eDRX intervals of several minutes. However, it is noted that for shorter eDRX intervals, the time to the next single PO is similar to the repetition interval and thus repetition of the page transmission may not be necessary.

According to embodiments, the UE may request a particular PO repetition spacing value or a default value related to the eDRX interval can be assigned. According to some embodiments, the default value can be determined taking into account the known inter-cell timing discrepancy. In some embodiments, a range of default PO repetition spacing values can be defined based on other UE parameters, eNB parameters and the like.

FIG. 2B illustrates UE reception operations synchronized with paging occasions for three different scenarios. In the first scenario 230, the UE remains served by the eNB 200 and the UE can operate its receiver during two time intervals 235 synchronized with the two POs 205 of the eNB 200. In the second scenario 240 and third scenario 250, the UE has left the service of the previous eNB 200 however the UE is unaware of this departure. In the second scenario 240 the UE is now served by the new eNB 210 while in the third scenario the UE is now served by the new eNB 220. For both the second and third scenarios the UE awakes at the time of the first PO for the previous eNB 200 and does not detect the PO. However the UE is able to detect that there has been a change in the PO timing. In the second scenario 240 the UE is able to adjust the wake up timing in accordance with the new eNB 210 and thus the UE sets the wake up timing to occur at the time of the second PO of the new eNB 210. In the third scenario 250, the UE is able to adjust the wake up timing in accordance with the new eNB 220 and thus the UE is able to set the wake timing to occur at the time of both the first and second POs associated with the new eNB 220.

Notably, the POs in FIG. 2B are spaced apart by an amount of time comparable to (greater than) the inter-cell time discrepancy. This can enable the UE, when mobile between cells, to receive the page transmission of an eNB 210 that is time-advanced relative to the previous eNB 200. Furthermore, for the case of an eNB 220 that is time-delayed relative to the previous eNB 200, the UE can potentially still receive both pages transmitted by the time-delayed eNB 220. As such, sufficient temporal spacing between POs leads to a potential improvement in paging reception opportunities and hence paging reliability.

FIG. 2C illustrates a scenario in which the UE is able to wake earlier than the worst-case earliest possible PO due to time mis-alignment between eNBs. In particular, the UE wakes at a time 260 which is in advance of the next upcoming PO (according to the timing of the current serving eNB 200), minus a maximum expected inter-cell timing discrepancy. This early waking of the UE may allow the UE to re-align its timing to attempt to always monitor for page transmissions during both scheduled POs. This allows the UE to synchronize its reception to the upcoming POs. For example, if the timing corresponds to that of the eNB 210, then the UE can operate its receiver at times 270 to synchronize with POs 215. If the timing corresponds to that of the eNB 200, then the UE can operate its receiver at times 275 to synchronize with POs 205. If the timing corresponds to that of the eNB 220, then the UE can operate its receiver at times 280 to synchronize with POs 225. However, this early waking operation by the UE can result in extra power being used due to a longer active reception period, which is undesirable.

Various embodiments of the present invention may be implemented as a computer-implemented method, namely a method whose steps are implemented by computing devices such as by a combination of LTE network infrastructure devices such as eNBs or related infrastructure equipment as well as LTE wireless terminal UEs such as MTC UEs or other UEs. The method may thus be implemented in a distributed manner. The computing devices may implement the method by executing, by a microprocessor, computer instructions stored in memory and operating various electronics associated with and controlled by the computing devices accordingly. Additionally or alternatively, some or all of the operations of the computing devices may be executed by electronics executing firmware instructions or dedicated electronics hardware configured to operate in a predetermined manner when presented with predetermined patterns of electronic inputs.

Various embodiments of the present invention may correspond to a system comprising a combination of LTE network infrastructure devices such as eNBs or related infrastructure equipment as well as LTE wireless terminal UEs such as MTC UEs or other UEs. The system may be described in terms of interacting modules, wherein each module corresponds to a selection of electronic components operating together to produce an effect. Such a system is illustrated for example in FIG. 3, and described below.

Figure 3:
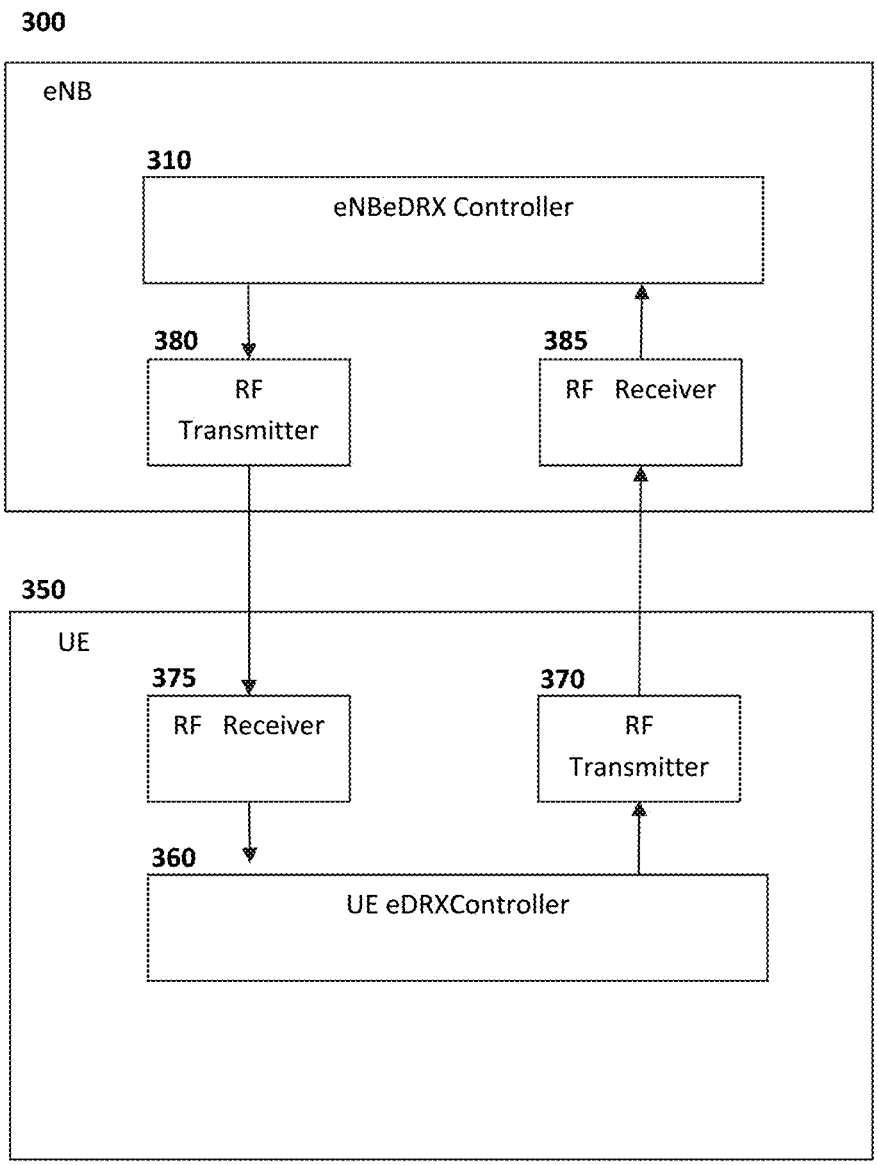
FIG. 3 illustrates a system including a UE and a base station such as an evolved NodeB (eNB) in accordance with embodiments of the present invention.

FIG. 3 illustrates a system comprising an Evolved Node B (eNB) 300 and a user equipment (UE) 350 in a Long Term Evolution (LTE) wireless communication system. The UE 350 comprises a UE eDRX controller 360, which is configured to manage the eDRX operation of the UE. In some embodiments, the UE eDRX controller 360 is configured to actively determine PO repetition parameters for transmission to the eNB eDRX controller 310. The UE 350 further comprises various other features such as a wireless communication module, comprising a RF transmitter 370 and RF receiver 375, the wireless communication module configured to facilitate communication with the eNB via an appropriate protocol, such as LTE. Other functionalities of a UE configured to operate in accordance with a standard such as LTE would be readily understood by a worker skilled in the art. The PO repetition parameters provided by the UE eDRX controller 360 are transmitted to the eNB via the RF transmitter 370.

The eNB 300 comprises an eNB eDRX controller 310, which is configured to manage the paging operation of the eNB. In some embodiments the eNB eDRX controller 310 is configured to modify eDRX operation in light of instructions received from the UE. The eNB 300 further comprises various other features such as a wireless communication module, comprising a RF transmitter 380 and RF receiver 385, the wireless communication module configured to facilitate communication with the UE via an appropriate protocol, such as LTE. Other functionalities of an eNB configured to operate in accordance with a standard such as LTE would be readily understood by a worker skilled in the art.

According to embodiments, while the UE can request a particular set of parameters to be enabled by the base station, in some instances the base station is unable to provide the requested parameters, for example due to sharing resources between plural UEs or other parameters as would be readily understood by a worker skilled in the art. As such, it is the base station or depending on the configuration, the network controlling paging in multiple base stations, that defines the parameters relating to eDRX and PO which are to be used. The base station will subsequently provide the particular details relating to the revised eDRX time interval, revised PO repetition value and/or revised PO repetition spacing for use by the UE.

The UE eDRX controller 360 comprises a microprocessor operatively coupled to memory, the memory having stored therein program instructions for execution by the microprocessor in order to perform eDRX controller operations as described herein. Operations can be performed based on logic statements, lookup table operations, or the like, or a combination thereof. Alternatively, other electronic circuitry, such as application specific integrated circuitry, logic array circuitry, or the like, can be used to perform some or all eDRX controller operations.

The eNB eDRX controller 310 comprises a microprocessor operatively coupled to memory, the memory having stored therein program instructions for execution by the microprocessor in order to perform eDRX controller operations as described herein. Operations can be performed based on logic statements, lookup table operations, or the like, or a combination thereof. Alternatively, other electronic circuitry, such as application specific integrated circuitry, logic array circuitry, or the like, can be used to perform some or all eDRX controller operations.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for paging a User Equipment (UE), the method comprising:
  determining, by a base station serving the UE, an enhanced discontinuous reception (eDRX) time interval, a value for paging occasion (PO) repetition and a PO repetition spacing based on one or more parameters, wherein the PO repetition spacing is indicative of a time interval between a page transmission and a page transmission repetition within the eDRX time interval, wherein the eDRX time interval is greater than the PO repetition spacing, wherein the one or more parameters are selected by the base station for determining the eDRX time interval, the value for PO repetition and the PO repetition spacing, wherein the determined eDRX time interval, the determined value for PO repetition and the determined PO repetition spacing are determinative for a second eDRX time interval to be used by the UE, second value for PO repetition to be used by the UE and a second PO repetition spacing to be used by the UE, respectively, wherein determining the eDRX time interval, the value for PO repetition and the PO repetition spacing includes prior to selecting the one or more parameters, wirelessly receiving, from the UE, indications of an initial eDRX time interval determined by the UE, an initial value for PO repetition determined by the UE and an initial PO repetition spacing determined by the UE, wherein the one or more parameters include the indications, wherein the base station determines when the eDRX time interval and the value for PO repetition are to be the same as the initial eDRX time interval and the initial value for PO repetition, respectively; and transmitting, by the base station, the page transmission and the page transmission repetition based on the eDRX time interval, the value for PO repetition and the PO repetition spacing, in accordance with a paging schedule synchronized with the UE's monitoring schedule.

2. The method of claim 1, wherein the PO repetition spacing is configured to be at least equal to an inter-cell timing discrepancy indicative of expected variations in paging timings between base stations.

3. The method of claim 1, wherein the one or more parameters are indicative of one or more of: mobility requirements of the UE; power requirements of the UE; latency requirements of the UE; and requirements of one or more applications operating in association with the UE.

4. The method of claim 1, wherein the eDRX time interval and the value for PO repetition determined by the base station are transmitted by the base station to the UE before transmitting the page transmission and the page transmission repetition.

5. A method for receiving pages by a User Equipment (UE), the method comprising:

determining, by the UE, an enhanced discontinuous reception (eDRX) time interval, a value for paging occasion (PO) repetition and a PO repetition spacing based on one or more parameters, wherein the PO repetition spacing is indicative of a time interval between a page transmission and a page transmission repetition within the eDRX time interval, wherein the eDRX time interval is greater than the PO repetition spacing, wherein the determined eDRX time interval, the determined value for PO repetition and the determined PO repetition spacing at least in part comply with one or more UE requirements indicated in the one or more parameters;

transmitting information indicative of the eDRX time interval, the value for PO repetition and the PO repetition spacing to a base station;

receiving, from the base station, second information indicative of a second eDRX time interval, a second value for PO repetition and a second PO repetition spacing, the second eDRX time interval, the second value for PO repetition and the second PO repetition spacing determined by the base station; and monitoring, by the UE, for the page transmission and the page transmission repetition at times based on the second eDRX time interval, the second value for PO repetition and the second PO repetition spacing received from the base station, in accordance with a paging schedule synchronized with the UE's monitoring schedule.

6. The method of claim 5, wherein transmitting information indicative of the eDRX time interval and the value for PO repetition comprises wirelessly transmitting values of the eDRX time interval and the value for PO repetition to the base station.

7. The method of claim 5, wherein the PO repetition spacing is configured to be at least equal to an inter-cell timing discrepancy indicative of expected variations in paging timings between base stations.

8. The method of claim 5, wherein the one or more parameters are indicative of one or more of: mobility requirements of the UE; power requirements of the UE; latency requirements of the UE; and requirements of one or more applications operating in association with the UE.

9. A system for paging a User Equipment (UE), the system comprising:

a UE having a UE enhanced discontinuous reception (eDRX) controller configured to manage eDRX operation of the UE; and an eNB having an eNB eDRX controller configured to manage a paging operation of the eNB, wherein the UE eDRX controller and the eNB eDRX controller are cooperatively configured to determine an eDRX time interval, value for paging occasion (PO) repetition and a PO repetition spacing based on one or more parameters, wherein the PO repetition spacing is indicative of a time interval between a page transmission and a page transmission repetition within the eDRX time interval, wherein the eDRX time interval is greater than the PO repetition spacing, wherein the one or more parameters are selected by the eNB for determining the eDRX time interval, the value for PO repetition and the PO repetition spacing, wherein the UE eDRX controller and the eNB eDRX controller share one or more of the determined eDRX time interval, the determined value for PO repetition, the determined PO repetition spacing and the one or more parameters in a configuration phase, wherein the eNB eDRX controller is further configured to direct the base station to transmit the page transmission and the page transmission repetition based on the eDRX time interval, the value for PO repetition and the PO repetition spacing, wherein the UE eDRX controller is further configured to direct the UE to monitor for the page transmission and the page transmission repetition based on the eDRX time interval, the value for PO repetition and the PO repetition spacing.

10. A user equipment (UE) for use with a wireless communication network, the UE comprising an enhanced discontinuous reception (eDRX) controller configured to:

determine an eDRX time interval, a value for paging occasion (PO) repetition and a PO repetition spacing based on one or more parameters, wherein the PO repetition spacing is indicative of a time interval between a page transmission and a page transmission repetition within the eDRX time interval, wherein the eDRX time interval is greater than the PO repetition spacing, wherein the determined eDRX time interval, the determined value for PO repetition and the determined PO repetition spacing at least in part comply with one or more UE requirements indicated in the one or more parameters;

direct the UE to communicate either the eDRX time interval, the value for PO repetition and the PO repetition spacing or the one or more parameters to the base station;

direct the UE to receive, from the base station, second information indicative of a second eDRX time interval, a second value for PO repetition and a second PO repetition spacing, the second eDRX time interval, the second value for PO repetition and the second PO repetition spacing determined by the base station; and direct the UE to monitor for the page transmission and the page transmission repetition at times which are based on the second eDRX time interval, the second value for PO repetition and the second PO repetition spacing received from the base station, in accordance with a paging schedule synchronized with the UE's monitoring schedule.

11. The UE of claim 10, wherein the eDRX controller is further configured to: determine a PO repetition spacing based on the one or more parameters, the PO repetition spacing indicative of a time interval between the page transmission and the page transmission repetition; and direct the UE to monitor for the page transmission and a page transmission repetition at times which are further based on the PO repetition spacing.

12. The UE of claim 10, wherein the one or more parameters are indicative of one or more of: mobility requirements of the UE; power requirements of the UE; latency requirements of the UE; and requirements of one or more applications operating in association with the UE.

13. A wireless communication network base station comprising an enhanced discontinuous reception (eDRX) controller configured to:

determine an eDRX time interval, a value for paging occasion (PO) repetition and a PO repetition spacing based on information received from a user equipment (UE), the eDRX time interval and the value for PO repetition based on one or more parameters, wherein the PO repetition spacing is indicative of a time interval between a page transmission and a page transmission repetition within the eDRX time interval, wherein the eDRX time interval is greater than the PO repetition spacing, wherein the one or more parameters are selected by the base station for determining the eDRX time interval, the value for PO repetition and the determined PO repetition spacing, wherein the determined eDRX time interval, the determined value for PO repetition and the determined PO repetition spacing are determinative for a second eDRX time interval to be used by the UE, a second value for PO repetition to be used by the UE and a second PO repetition spacing to be used by the UE, respectively, wherein determining the eDRX time interval, the value for PO repetition and the PO repetition spacing includes prior to selecting the one or more parameters, wirelessly receiving, from the UE, indications of an initial eDRX time interval determined by the UE, an initial value for PO repetition determined by the UE and an initial PO repetition spacing determined by the UE, wherein the one or more parameters include the indications, and determine when the eDRX time interval and the value for PO repetition are to be the same as the initial eDRX time interval and the initial value for PO repetition, respectively; and direct the base station to transmit the page transmission and the page transmission repetition at times which are based on the eDRX time interval, the value for PO repetition and the PO repetition spacing, in accordance with a paging schedule synchronized with the UE's monitoring schedule.

14. The base station of claim 13, wherein the one or more parameters are indicative of one or more of: mobility requirements of the UE; power requirements of the UE; latency requirements of the UE; and requirements of one or more applications operating in association with the UE.

15. The base station of claim 13, wherein the controller is further configured to determine a revised eDRX time interval and a revised value for PO repetition based on sharing of base station resources between plural UEs.

* * * * *